(12) United States Patent
Leijon et al.

(10) Patent No.: US 9,048,725 B2
(45) Date of Patent: Jun. 2, 2015

(54) ELECTRIC DEVICE AND A METHOD FOR A WAVE POWER PLANT

(75) Inventors: Mats Leijon, Uppsala (SE); Cecilia Bostrom, Uppsala (SE); Mikael Eriksson, Uppsala (SE)

(73) Assignee: Seabased AB, Uppsala (SE)

( * ) Notice: Subject to any disclaimer, the term of this patent is extended or adjusted under 35 U.S.C. 154(b) by 0 days.

(21) Appl. No.: 13/992,290

(22) PCT Filed: Dec. 9, 2010

(86) PCT No.: PCT/SE2010/051356
§ 371 (c)(1),
(2), (4) Date: Jun. 7, 2013

(87) PCT Pub. No.: WO2012/078084
PCT Pub. Date: Jun. 14, 2012

(65) Prior Publication Data
US 2013/0270831 A1    Oct. 17, 2013

(51) Int. Cl.
*F03B 13/10* (2006.01)
*F03B 13/12* (2006.01)
(Continued)

(52) U.S. Cl.
CPC ........... *H02M 7/103* (2013.01); *F03B 13/1845* (2013.01); *F03B 15/00* (2013.01);
(Continued)

(58) Field of Classification Search
CPC ......... Y02E 10/20; Y02E 10/30; Y02E 10/70; Y02E 10/763; F03B 13/10; F03B 13/12; F03B 13/26; F03B 15/00; F03B 17/00; F03B 3/16; F03B 17/025; H02P 2009/003; B60K 2016/00; B60L 8/00; H02H 3/05; H02H 3/083; H02H 3/13; H02H 3/165; H02H 3/253; H02H 5/042; H02H 5/044; H02H 5/047; H02H 7/05; H02H 7/06; H02H 7/0838; H02H 7/16; H02H 7/20; H02H 9/02; H02M 1/4216; H02M 1/4233; H02M 1/4241; H02M 3/06; H02M 3/10; F05B 2240/10; F05B 2240/24
USPC ............ 290/53, 43, 42; 361/93.9, 87, 31, 85, 361/86; 324/537; 363/48, 70, 89, 61; 60/495; 315/55; 405/76; 700/292; 416/84; 322/24, 28, 44
See application file for complete search history.

(56) References Cited

U.S. PATENT DOCUMENTS 3,181,031 A * 4/1965 Yee .................................. 361/17
3,242,383 A * 3/1966 Opad ............................ 361/88
(Continued)

FOREIGN PATENT DOCUMENTS

DE         4418581        10/1994
DE      102006026465     12/2007
(Continued)

OTHER PUBLICATIONS

English Abstract of DE4418581.
(Continued)

*Primary Examiner* — Tulsidas C. Patel
*Assistant Examiner* — Charles Reid, Jr.
(74) *Attorney, Agent, or Firm* — Dykema Gossett PLLC

(57) ABSTRACT

The invention relates to an electric device with a winding (12) and means for inducing a current in the winding. A bridge circuit (400) electrically connects the winding (12) to a load (13). According to the invention the bridge circuit (400) includes capacitor means (401, 402), which is adapted for obtaining resonance with the impedance of the winding (12).

16 Claims, 3 Drawing Sheets

(51) Int. Cl.
*H02P 9/04* (2006.01)
*H02P 9/00* (2006.01)
*H02M 7/10* (2006.01)
*F03B 13/18* (2006.01)
*F03B 15/00* (2006.01)
*H02P 9/48* (2006.01)

(52) U.S. Cl.
CPC ............ *F05B2220/707* (2013.01); *H02P 9/48* (2013.01); *Y02E 10/38* (2013.01); *F03B 13/18* (2013.01); *H02P 2101/10* (2015.01)

(56) References Cited

U.S. PATENT DOCUMENTS

| | | | |
|---|---|---|---|
| 3,996,508 A * | 12/1976 | Board | 323/277 |
| 4,264,856 A * | 4/1981 | Frierdich et al. | 322/25 |
| 4,410,848 A * | 10/1983 | Frierdich | 322/25 |
| 4,449,176 A * | 5/1984 | Turnbull | 363/81 |
| 4,539,485 A * | 9/1985 | Neuenschwander | 290/53 |
| 4,922,397 A | 5/1990 | Heyman | |
| 5,055,990 A * | 10/1991 | Miki et al. | 363/56.05 |
| 5,404,287 A * | 4/1995 | Poumey | 363/21.02 |
| 5,499,178 A * | 3/1996 | Mohan | 363/39 |
| 5,574,636 A * | 11/1996 | Lee et al. | 363/132 |
| 5,608,292 A * | 3/1997 | Konopka et al. | 315/209 R |
| 5,684,683 A * | 11/1997 | Divan et al. | 363/65 |
| 5,933,012 A * | 8/1999 | Bengtsson et al. | 324/524 |
| 5,936,855 A * | 8/1999 | Salmon | 363/46 |
| 6,108,223 A * | 8/2000 | Julian et al. | 363/78 |
| 6,268,990 B1 * | 7/2001 | Ogura et al. | 361/91.7 |
| 6,429,546 B1 * | 8/2002 | Ropp et al. | 307/31 |
| 6,495,913 B2 * | 12/2002 | Gruning | 257/718 |
| 6,731,019 B2 * | 5/2004 | Burns et al. | 290/42 |
| 6,933,704 B2 * | 8/2005 | Nelson et al. | 322/29 |
| 6,954,366 B2 * | 10/2005 | Lai et al. | 363/71 |
| 7,045,912 B2 * | 5/2006 | Leijon et al. | 290/42 |
| 7,126,235 B2 * | 10/2006 | Bernhoff et al. | 290/44 |
| 7,456,510 B2 * | 11/2008 | Ito et al. | 290/44 |
| 7,538,445 B2 | 5/2009 | Kornbluh et al. | |
| 8,422,257 B2 * | 4/2013 | Asplund | 363/71 |
| 2001/0011499 A1 * | 8/2001 | Reyes | 95/7 |
| 2001/0036088 A1 * | 11/2001 | Wittenbreder, Jr. | 363/17 |
| 2002/0191362 A1 * | 12/2002 | Simms et al. | 361/103 |
| 2003/0133317 A1 * | 7/2003 | Norrga | 363/127 |
| 2004/0251692 A1 * | 12/2004 | Leijon et al. | 290/42 |
| 2005/0121915 A1 * | 6/2005 | Leijon et al. | 290/42 |
| 2005/0264245 A1 * | 12/2005 | Donnelly | 318/139 |
| 2006/0114696 A1 * | 6/2006 | Igarashi et al. | 363/13 |
| 2006/0192437 A1 * | 8/2006 | Tolle et al. | 307/113 |
| 2007/0040384 A1 * | 2/2007 | Bernhoff et al. | 290/42 |
| 2007/0273335 A1 * | 11/2007 | Duff, Jr. | 320/166 |
| 2007/0296275 A1 * | 12/2007 | Joho | 307/47 |
| 2007/0296373 A1 * | 12/2007 | Lam | 318/727 |
| 2008/0053084 A1 | 3/2008 | Stansby et al. | |
| 2008/0122408 A1 * | 5/2008 | Keiter et al. | 322/28 |
| 2008/0180164 A1 * | 7/2008 | Pelly | 327/552 |
| 2008/0290843 A1 * | 11/2008 | Ganev et al. | 322/28 |
| 2009/0236916 A1 * | 9/2009 | Nishimura | 307/80 |
| 2010/0007209 A1 * | 1/2010 | Eppler et al. | 307/36 |
| 2011/0175360 A1 | 7/2011 | Leijon et al. | |

FOREIGN PATENT DOCUMENTS

| | | |
|---|---|---|
| JP | 2009118637 | 11/2007 |
| WO | 03058055 | 7/2003 |
| WO | 2004085842 | 10/2004 |
| WO | 2005024741 | 3/2005 |

OTHER PUBLICATIONS

English Abstract of DE 102006026465.
English Abstract of JP 2009-118637.

* cited by examiner

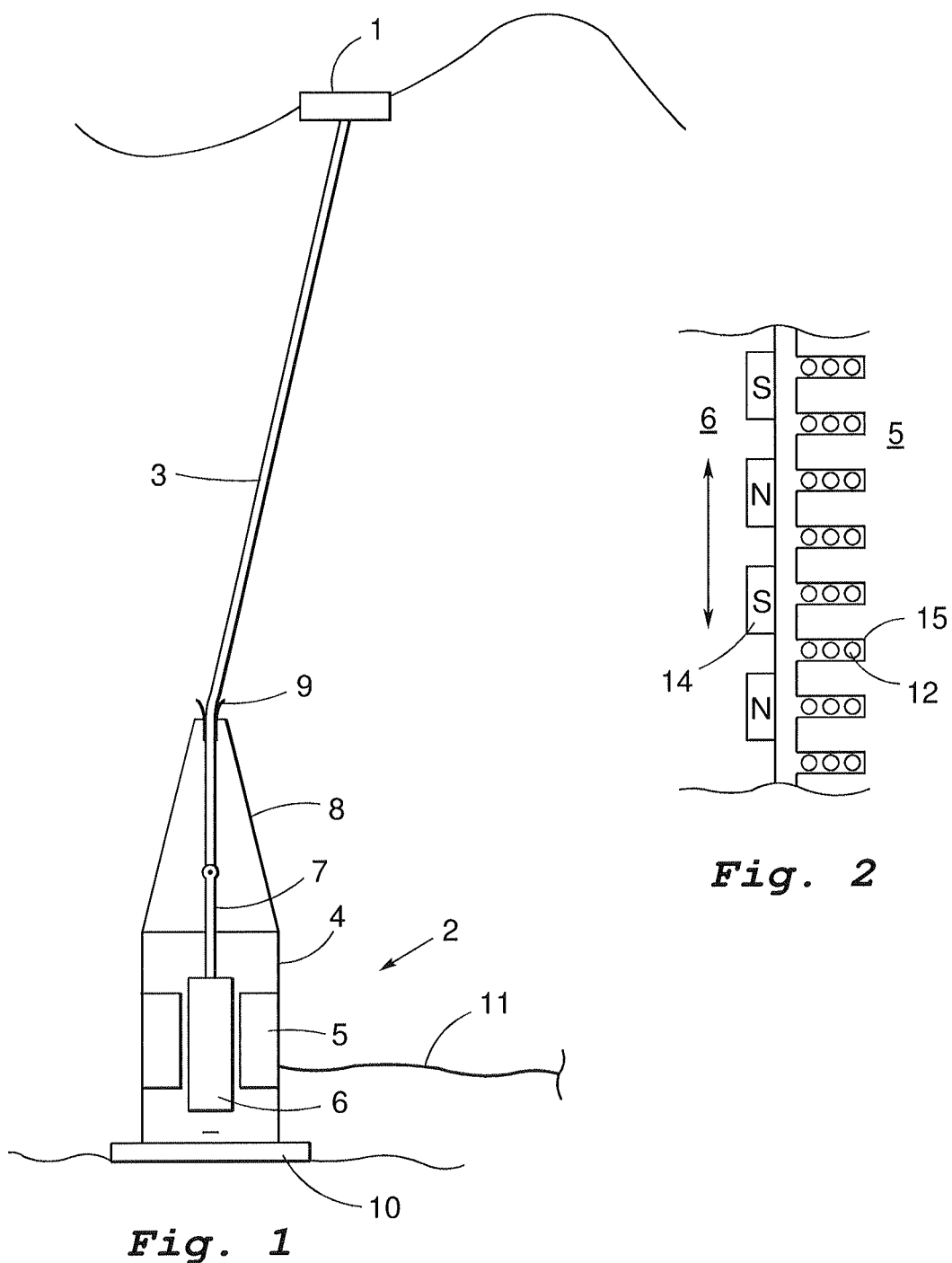

ELECTRIC DEVICE AND A METHOD FOR A WAVE POWER PLANT

FIELD OF INVENTION

The present invention in a first aspect relates to an electric device including a winding, means for inducing a current in the winding and an electrical bridge circuit with capacitor means. The invention also relates to a wave power plant including a plurality of such electric devices and to an electric network connected to at least one such electric device.

In a second aspect the invention relates to a use of such an electric device.

In a third aspect the invention relates to a method for controlling an electric winding in which a current is induced.

BACKGROUND OF INVENTION

Wave movements in the sea and in large inland lakes constitute a potential source of energy that has scarcely been exploited so far. However various suggestions have been made to use the vertical movements of the sea for producing electrical power in a generator. Since a point on the sea surface makes a reciprocating vertical movement it is suitable to use a linear generator to produce the electric power.

WO 03/058055 discloses such a wave power unit where the moving part of the generator, i.e. the part that corresponds to the rotor in a rotating generator and in the present application called translator, reciprocates in relation to the stator of the generator. In that disclosure the stator is anchored in the sea bed. The translator is by a wire, cable or a chain connected to a body floating on the sea.

For a wave power unit of this kind it is important to optimize the amount of the wave energy that is absorbed by the wave power unit and supplied as electric energy. This includes considerations relating to the mechanical as well as the electrical aspects of the system. The amount of power absorbed by the wave power unit is dependent on the hydrodynamic parameters and damping factors of the energy system. The floating body determines the hydrodynamic parameters and the load, together with the generator and the sea cable generates the damping factors.

A high power capture ratio, defined as the quotient between the extracted power divided by the power incident on the cross section of the floating body, is achieved when the natural frequency of the wave power unit coincides with the wave frequency. Therefore it is desirable to reach a design of the wave power unit that results in such mechanical resonance. However the various parameters that have to be considered and various other requirements that the system has to meet renders it very complicated to optimize the power capture ratio by the design of the mechanical components of the system.

The present invention is focused on the electrical components of the system. It is well known that electrical resonance in an electrical circuit involving capacitors and inductors can create high voltages and high power, so-called reactive power. However, since this can cause damage both to traditional generators and other electric power components, electrical resonance is generally avoided in electrical systems and networks. Hence, there lies a great potential for improved power conversion in overcoming the detrimental effects of electrical resonance in an electrical circuit. The object of the invention thereby is to increase the power capture ratio of an electric device which may be used as a wave power unit to produce electric energy.

SUMMARY OF INVENTION

The object of the present invention is achieved in that an electric device of the kind specified in the introduction includes the specific features that an electrical supply circuit, hereinafter also referred to as an electrical bridge circuit, or simply bridge circuit, includes capacitor means having a capacitance for obtaining resonance with the inductance of the winding.

The electric resonance occurs when $$\omega = \frac{1}{\sqrt{LC}}.$$

However, the resonance specified for the bridge circuit is to be interpreted to mean not only exact resonance but also a deviation up to 10% from that value. The resonance also results in a high dampening of the generator. If the components are adequately dimensioned, this resonance will increase the power capture ratio of the system. The electric resonance obtained with the present invention thereby offers an effective and less complicated alternative than mechanical measures for providing resonance with the wave frequency or establishes a complement to such mechanical measures.

According to a preferred embodiment, the bridge circuit further includes semiconductor means having one or more semiconductors.

The high reactive power created at resonance thereby at least partly can be utilized as active power. Normally the reactive power in a resonance circuit will merely shuttle between the inductance and the capacitance. By providing semiconductors in the bridge circuit for phase control, a part of this power instead can be directed to the load and made use of. This will further contribute to increase the power output of the electric device.

According to a further embodiment, the semiconductor means includes one or more diodes.

According to a further preferred embodiment, the semiconductor means includes one or more thyristors.

According to a further preferred embodiment, the semiconductor means includes one or more insulated gate bipolar transistors (IGBTs).

Thus either passive or active components can be used in the bridge circuit, whereby cost aspects and the quality aspects will determine which kind is used. Of course diodes, thyristors and IGBTs can be used in combination.

According to a further preferred embodiment, the bridge circuit includes a first, a second and a third branch connected to the load, the first branch having a capacitor in parallel to the load, the second and third branch each having two semiconductors, which all are arranged in the same direction, and the winding being connected to the second branch between the two semiconductors and to the third branch between the two semiconductors, respectively.

According to a further preferred embodiment, the bridge circuit includes a first and a second branch connected to the load, the first branch having a first capacitor and a first semiconductor, the second branch having a second capacitor and a second semiconductor, the winding being connected to the first branch between the first capacitor and the first semiconductor and to the second branch between the second capacitor and the second semiconductor and whereby the first capacitor and the second semiconductor is connected to the load via a third semiconductor, and the first semiconductor and the second capacitor is connected to the load via a fourth semiconductor.

According to a further preferred embodiment, the bridge circuit includes an IGBT via which the winding is connect to the load, and further includes a first branch in parallel to the IGBT and a second branch in parallel to the winding, which first and second branch each includes a capacitor and whereby a semiconductor is located between the first and the second branch.

The above embodiments related to the layout of the bridge circuit all result in a very effective transfer of the power that otherwise would be lost as reactive power into active power at the load.

According to a further preferred embodiment, the winding is a multi-phase winding, such as a three-phase winding.

Thereby the electric device will be easily adapted to supply energy to the grid.

According to a further preferred embodiment, the bridge is connected to an electric load.

According to a further preferred embodiment, the electric device includes a transformer, a generator and/or a high-voltage, direct current (HVDC) cable.

According to a further preferred embodiment, the winding is the stator winding of the generator and in the means for inducing current in the winding is magnets on a moving part of the generator.

According to a further preferred embodiment, the electric device includes a drive source powered by wind or by sea waves, which drive source is in drive connection with the moving part of the generator.

According to a further preferred embodiment, the generator is a linear generator having a reciprocating translator as the moving part.

According to a further preferred embodiment, the drive source is a floating body mechanically connected to the translator by flexible connection means.

The invention also relates to a wave power plant that includes a plurality of electric devices according to the present invention, in particular to any of the preferred embodiments thereof.

The invention also relates to an electrical network that includes a connection to an electric device according to the present invention, in particular to any of the preferred embodiments thereof.

In the second aspect of the invention the invented electric device is used for producing electric power and supplying the power to an electrical network.

In the third aspect of the invention the object is met in that the method of the kind specified in the introduction includes the specific measures of arranging capacitor means in the bridge circuit, which capacitor means has a capacitance that is adapted for obtaining resonance with the inductance of the winding.

According to preferred embodiments of the invented method, the method is carried out with an electric device according to the present invention, in particular to any of the preferred embodiments thereof.

The invented wave power plant, the invented electric network, the invented use and the invented method all have advantages corresponding to those of the invented electric device and the preferred embodiments thereof and which have been described above.

The above described preferred embodiments of the invention are specified in the dependent claims. It is to be understood that further preferred embodiments of course can be constituted by any possible combination of the preferred embodiments above and by any possible combination of these and features mentioned in the description of examples below.

The invention will be further explained through the following detailed description of examples thereof and with reference to the accompanying drawings.

SHORT DESCRIPTION OF THE DRAWINGS

FIG. 1 is a side view of an electric device according to the present invention, here represented by a wave power unit.

FIG. 2 is a section through a part of a detail of the generator of the electric device in FIG. 1.

Figure 8:
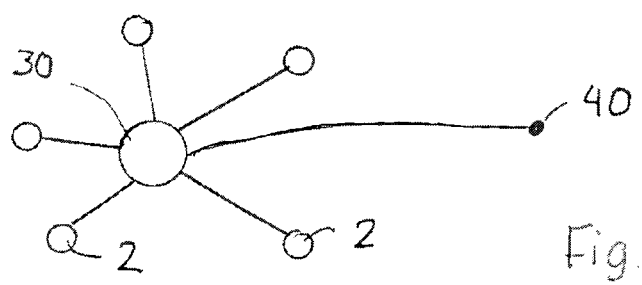

FIG. 8 diagrammatically illustrates a wave power plant according to the present invention.

DESCRIPTION OF EXAMPLES

FIG. 1 is a schematic side view of an electric device according to the invention, adapted as a wave power unit in operation in the sea. A floating body 1 floats on the sea surface and is connected by a connection means 3 such as a cable, wire, rope, chain or the like, to a linear generator 2 anchored at the sea bed. In the figure the generator is attached at the sea bed. It is, however, to be understood that the generator can be located above the sea bed and be anchored in some other way.

The linear generator 2 has a stator 5 with winding and a translator 6 with magnets. The translator 6 is able to reciprocate up and down within the stator 5 thereby generating current in the stator winding, which current by an electric cable 11 is transferred to an electric network.

The translator 6 includes a rod 7 to which the wire 3 is attached. When the floating body 1 due to the wave movements of the sea surface is forced to move up the floating body will pull the translator 6 upwardly. When the floating body thereafter moves down the translator 6 will move down through gravity. Optionally, but preferably, a spring (not shown) or the like acting on the translator 6 provides an additional force downwards.

FIG. 2 illustrates the cooperation between the translator 6 and the stator 5. The figure only shows a part of the translator 6 and the stator 5, respectively. On the translator 6 there is provided a plurality of permanent magnets 14, which are distributed along a plurality of vertical rows on the surface of the translator 6 and face the stator 5. The figure shows only some of the magnets in one of these rows.

The stator 5 has a plurality of winding slots 15, which face the magnets 14 and in which the winding 12 is housed.

As the translator moves up and down, the magnets 14 travel in relation to the winding 12, whereby current is induced therein due to the changing magnetic flux φ. The voltage will be $$V = n \cdot \frac{d\Phi}{dt},$$

where n is the number of winding turns in a slot 15. The travelling time for a magnet 14 moving a distance corresponding to the vertical distance between the middle of two adjacent magnets 14 determines the frequency of the voltage.

The winding of the stator 5 is provided with a bridge circuit connected to a load via the cable 11. The bridge circuit has components arranged to establish resonance in the bridge circuit. FIGS. 3-7 illustrate some examples of the layout for such a bridge circuit.

Figure 3:
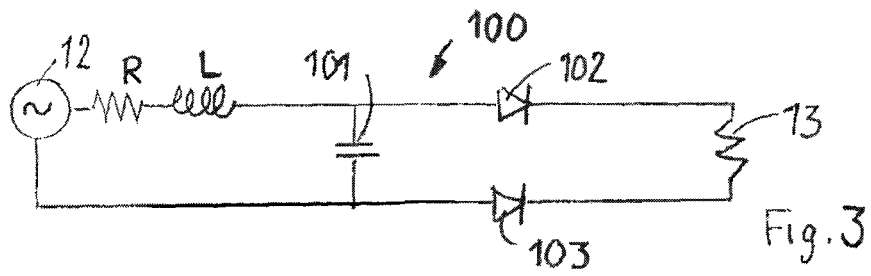
FIG. 3 illustrates a bridge circuit according to an example of the invention

A first example is illustrated in FIG. 3 shows a bridge circuit 100 according to the invention in its simplest form. The stator winding 12 having a resistance R and an inductance L is connected to the load 13 via two diodes 102, 103. A capacitor 101 is connected in parallel to the stator winding 12. The capacitor 101 has a capacitance tuned for resonance with the inductance L of the winding 12 at the frequency determined by the travelling time of the translator 6 a distance corresponding to the distance between two adjacent magnets on the translator 6.

Figure 4:
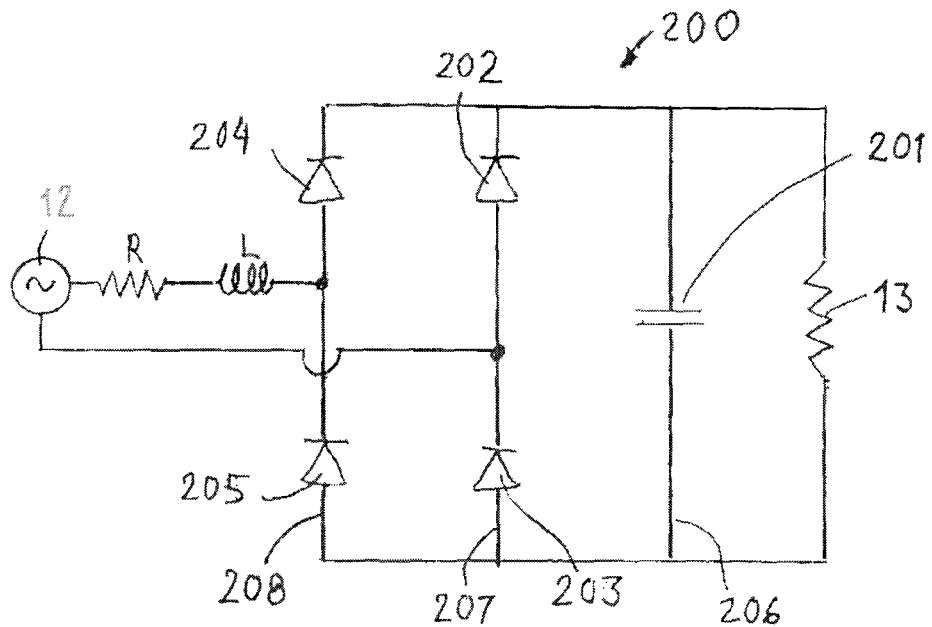
FIG. 4 illustrates a bridge circuit according to a further example of the invention.

In order to reduce the reactive power created by the resonance, the bridge circuit in practice should be more sophisticated than in the example of FIG. 3. In FIG. 4 an example of such a bridge circuit is illustrated. The bridge circuit in this example has three branches 206, 207, 208 connected to the load 13. A first 206 of these branches has a capacitor 201 for creating the resonance. Each of the other two branches 207, 208 has two diodes 202, 203; 204, 205 by which the reactive power is reduced and made use of for the load 13. The winding is connected to each of the second and third branches between the two diodes 202, 203; 203, 205 in the respective branch 207, 208.

Figure 5:
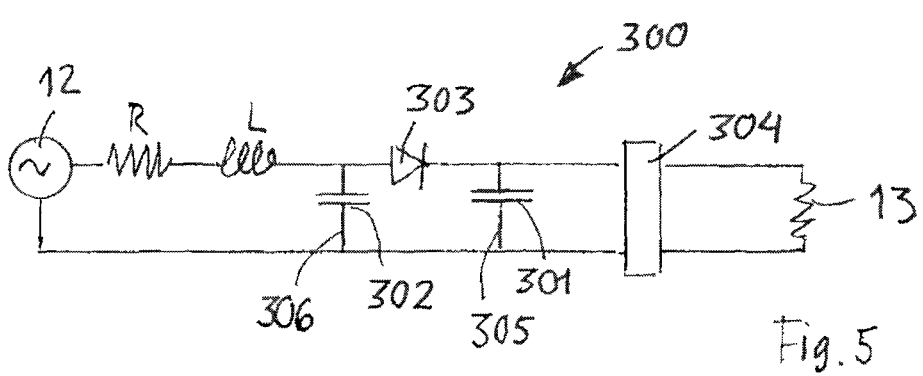
FIGS. 5-7 illustrate bridge circuits according to still further examples of the invention.

A further example is illustrated in FIG. 5. The bridge circuit 300 has an IGBT 304, via which the winding 12 is connected to the load 13. A first capacitor 301, is connected in parallel to the IGBT 304 in a first branch 305. A second capacitor 302 is connected in parallel to the winding 12 in a second branch 306. A diode 303 is located in the bridge circuit between the two branches 305, 306.

Figure 6:
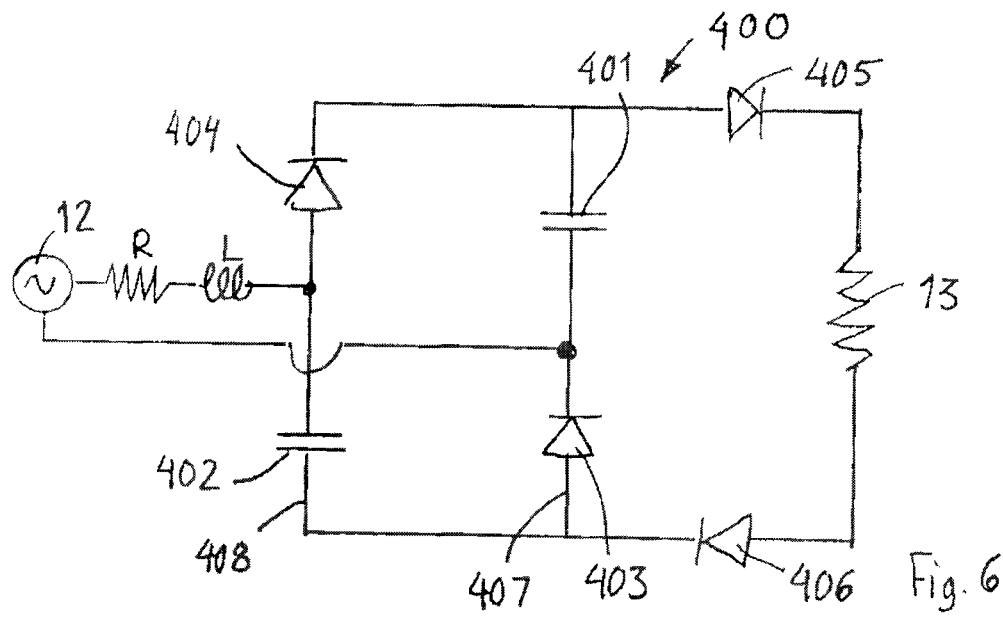

A still further example is illustrated in FIG. 6. The bridge circuit 400 includes two branches 407, 408. A first branch 407 has a first capacitor 401 and a first diode 403. The second branch 408 has a second capacitor 402 and a second diode. The winding 12 is connected to the first branch 407 between its capacitor 401 and its diode 403 and connected to the second branch 408 between its capacitor 402 and its diode 404. A third diode 405 connects the capacitor 401 of the first branch 407 and the diode 404 of the second branch 408 to the load 13. A fourth diode 406 connects the capacitor 402 of the second branch 408 and the diode 403 of the first branch 407 to the load 13.

It is to be understood that some or all of the diodes in the examples described above could be replaced by other kinds of passive or active semiconductors. Further, the illustrated layouts of the bridge circuit are only examples, and it is to be understood that various other layouts can be employed within the scope of the invention, including also layouts with a larger number of capacitors and/or semiconductors than in the illustrated examples. Each capacitor can be just one single capacitor, but it is to be understood that by the term capacitor also can be meant a battery of capacitors. The bridge circuit may also include additional components for measuring, controlling, governing, converting and similar purposes.

Figure 7:
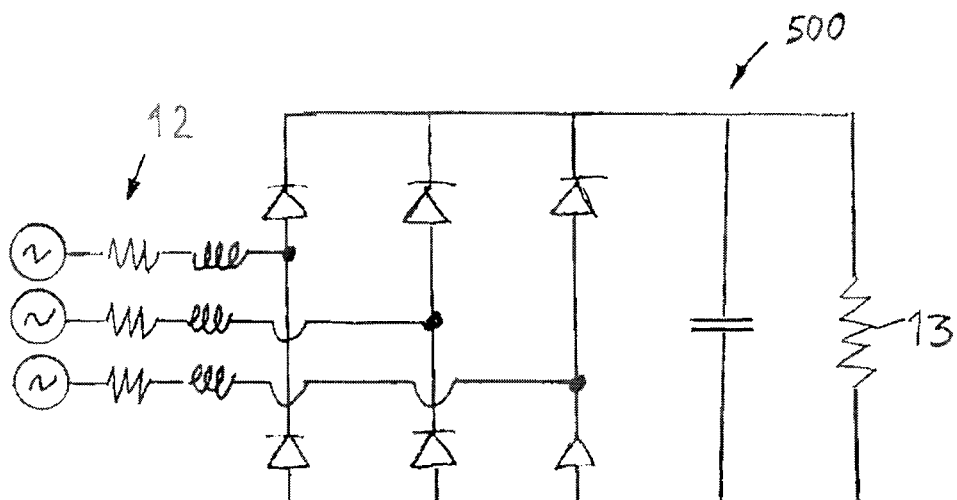

The above described examples all illustrate only one phase in order to simplify the presentation. In practice the bridge circuit normally will be arranged for three phases. FIG. 7 schematically illustrates an example of a three-phase application of the bridge circuit 500.

FIG. 8 in a view from above schematically illustrates a wave power plant having a plurality of electric devices of the kind described above. The generators 2 of these units all are connected to a submerged switchgear 30 connected to an electric network 40.

The functionality of the invented electric device having a bridge circuit creating resonance has been confirmed by tests, briefly described below. The test was carried out with an electric device adapted as a wave power unit with a translator with a gravity of 32,000 N. The translator force thus was the lifting force minus 32,000 N. As a reference a test was made for a load being solely resistive, with the following result, where all values represent maximum values.

| R | $V_{tot}$ (V) | $I_{tot}$ (A) | $P_{tot}$ (W) | Velocity (m/s) |
|---|---|---|---|---|
| 4 | 120 | 30 | 3600 | 0.22 |
| 8 | 120 | 15 | 1800 | 0.19 |

When testing the wave power unit with a bridge circuit as illustrated in FIG. 6, where the capacitance was 8.5 mF, the following data was obtained:

| Resistance | Itot [A] | $I_{load}$ [A] | $V_{load}$ [V] | $F_{translator}$ [N] | Velocity (m/s) | $P_{load}$ [W] |
|---|---|---|---|---|---|---|
| 4 | 75 | 60 | 300 | 23000 | 0.5 | 18000 |
| 8 | 65 | 50 | 400 | 29000 | 0.5 | 20000 |
| 16 | 90 | 60 | 500 | 32000 | 0.5 | 30000 |

A corresponding test for a capacitance of 11.8 mF resulted in the following data:

| Resistance | Itot [A] | $I_{load}$ [A] | $V_{Tot}$ [V] | $F_{translator}$ [N] | Velocity (m/s) | $P_{load}$ [W] |
|---|---|---|---|---|---|---|
| 4 | 90 | 50 | 200 | 20000 | 0.4643 | 10000 |
| 8 | 90 | 60 | 420 | 20000 | 0.45 | 25200 |
| 16 | 90 | 30 | 400 |  | 0.45 | 12000 |

The invention claimed is:

1. An electric device including a winding, means for inducing a current in the winding and an electrical bridge circuit, wherein the electrical bridge circuit includes capacitor means having a capacitance adapted for obtaining resonance with the impedance of the winding, wherein the bridge circuit includes a first and a second branch connected to an electric load, the first branch having a first capacitor and a first semiconductor, the second branch having a second capacitor and a second semiconductor, the winding being connected to the first branch between the first capacitor and the first semiconductor and to the second branch between the second capacitor and the second semiconductor and whereby the first capacitor and the second semiconductor is connected to the load via a third semiconductor, and the first semiconductor and the second capacitor is connected to the load via a fourth semiconductor.

2. The electric device according to claim 1, wherein the semiconductors includes one or more diodes.

3. The electric device according to claim 1, wherein the semiconductors includes one or more thyristors.

4. The electric device according to claim 1, wherein the semiconductors includes one or more insulated gate bipolar transistors (IGBTs).

5. An electric device including a winding, means for inducing a current in the winding and an electrical bridge circuit, wherein the electrical bridge circuit includes capacitor means having a capacitance adapted for obtaining resonance with the impedance of the winding, wherein the bridge circuit includes an IGBT via which the winding is connected to an electric load, and further includes a first branch in parallel to the IGBT and a second branch in parallel to the winding, which first and second branch each includes a capacitor and whereby a semiconductor is located between the first and the second branch.

6. The electric device according to claim 1, wherein the winding is a multi-phase winding.

7. The electric device according to claim 6, wherein the winding is a three-phase winding.

8. The electric device according to claim 1, wherein the bridge is connected to an electric load.

9. The electric device according to claim 1, wherein the electric device includes at least one of a transformer, a generator and an HVDC-cable.

10. The electric device according to claim 9, wherein the electric device includes a generator, the winding is the stator winding of the generator and the means for inducing current in the winding comprises magnets on a moving part of the generator.

11. The electric device according to claim 10, wherein the electric device includes a drive source powered by wind or by sea waves, which drive source is in drive connection with the moving part of the generator.

12. The electric device according to claim 11, wherein the generator is a linear generator having a reciprocating translator as the moving part.

13. The electric device according to claim 12, wherein the drive source is a floating body mechanically connected to the translator by flexible connection means.

14. A wave power plant, wherein the wave power plant includes a plurality of electric devices according to claim 12.

15. A method for controlling an electric winding in which winding a current is induced by connecting the winding to an electric bridge including capacitor means, and adapting the capacitance of the capacitor means to obtain resonance with the impedance of the winding, wherein the bridge circuit includes a first and a second branch connected to an electric load, the first branch having a first capacitor and a first semiconductor, the second branch having a second capacitor and a second semiconductor, the winding being connected to the first branch between the first capacitor and the first semiconductor and to the second branch between the second capacitor and the second semiconductor and whereby the first capacitor and the second semiconductor is connected to the load via a third semiconductor, and the first semiconductor and the second capacitor is connected to the load via a fourth semiconductor.

16. A method for controlling an electric winding in which winding a current is induced, by connecting the winding to an electric bridge including capacitor means, and adapting the capacitance of the capacitor means to obtain resonance with the impedance of the winding, wherein the bridge circuit includes an IGBT via which the winding is connected to an electric load, and further includes a first branch in parallel to the IGBT and a second branch in parallel to the winding, which first and second branch each includes a capacitor and whereby a semiconductor is located between the first and the second branch.

* * * * *